3,487,064
PROCESS FOR RECOVERY OF PROTEIN FROM WHEY USING A CROSS-LINKED DEXTRAN GEL

Emery Carlton Swanson, Robert John Henderson, and Robert Carlton Kyle, Minneapolis, Minn., assignors to Emery Carlton Swanson, Minneapolis, Minn.
No Drawing. Filed Mar. 15, 1967, Ser. No. 623,248
Int. Cl. C07g 7/00; A23c 5/00; A23k 1/08
U.S. Cl. 260—112                         11 Claims

ABSTRACT OF THE DISCLOSURE

A process permitting the recovery of protein from whey in which dried whey is mixed with water to provide a reconstituted whey liquid with high solids content and is then introduced into a bed of molecular sieve material having pores of a size permitting the penetration only of molecules smaller than whey protein, thereby entrapping said molecules and permitting the whey protein molecules to pass through the bed of molecular sieve material in an eluant, and the protein is recovered from the protein containing eluant. The elution of protein molecules from the molecular sieve material may be more efficiently accomplished by adding subsequent fractions of water to the bed to provide several eluant fractions, which may be combined for protein recovery. Further washing of the molecular sieve material with water ultimately removes the smaller entrapped molecules and regenerates the bed for further use.

---

This invention relates to a process for the recovery of protein from liquid residues of various manufacturing processes. In one important aspect this invention relates to the recovery of milk protein from whey in a process having high productive capacity.

In recent years the inefficient utilization of valuable protein resources has become a problem of major concern. As the world population grows the supply of animal protein has been unable to increase in sufficient amounts to supply human needs. Although nutritional protein is potentially available from fish and plant sources, large amounts of animal protein are lost or rendered economically unavailable to meet nutritional requirements. In the manufacture of cheese from milk approximately half of the milk solids are coagulated as cheese, the remaining solids—principally protein, lactose and salts—being contained in the residue or whey. Formerly whey was classified solely as a waste product of little potential use. At the present time some whey is fed to livestock, such as pigs, and to cattle in dried form. Primarily because of the salts present it is relatively unpalatable for human consumption unless mixed with more palatable foods. Some whey can be processed for human food by electrodialysis, but such processing has economic disadvantages. Most whey is still classified as a waste product whose disposal presents problems of stream pollution. Other similar high protein residues result as a by-product of beer manufacture, i.e. brewer's yeast, and from paper manufacture and other pulping operations as torula yeast.

It is an object of this invention to provide an economically attractive process for the recovery of protein from liquid waste residues and particularly a high productivity process for recovering protein from whey.

In its broadest aspects the process of this invention comprises mixing dried whey with water to provide a protein containing liquid having a whey solids content above 20 weight percent and a viscosity below about 30 centipoises at 25° C., passing this liquid through a bed containing a molecular sieve having pores of controlled size which are selectively penetrated by molecules smaller than protein to entrap such molecules, forcing the protein molecules through said bed in the aqueous liquid by eluting said protein molecules from said bed. The elution of protein from the bed is efficiently carried out by passing water through the bed, the protein molecules being removed in the eluant at a more rapid rate than the entrapped molecules of lactose and salts. After the desired protein is recovered, usually at least 50 weight percent of the initial whey protein, the protein containing eluant is preferably concentrated under conditions which will not degrade the protein, e.g. evaporation, and then dried under non-degradative conditions, conveniently by spray drying or freeze drying. The resulting dry product, composed predominantly of protein and containing lesser amounts of other nutrients, is palatable and nutritious. It is useful anywhere dry milk solids are used, such as in bakery products and mixes. It may be mixed with liquid and whipped to produce food toppings, frostings and the like.

It is essential to the practice of this invention to use dried whey in the preparation of the protein containing liquid feed, i.e. reconstituted dried whey, for the molecular sieve bed. Dried whey has a moisture content below about 6 percent and can be readily mixed with water to provide a protein containing liquid with a solids content above 20 percent, preferably above 30 percent. The solids content is desirably as high as possible consistent with a viscosity low enough to permit efficient passage of the liquid through the bed of dextran gel. To some extent the packing density of the dextran gel in the bed, the temperature of the fluid passing through the bed, the thickness of the bed, the use of differential pressure to assist fluid flow, and the like will affect the upper viscosity limits, but generally the viscosity should not exceed about 30 centipoises at 25° C. and preferably below 25 centipoises. The use of dried whey as the starting material for this process has been found to increase the productive capacity significantly. If whey is merely concentrated, such as by evaporation, to increase its solids content, the resulting whey concentrate cannot be passed through the bed of molecular sieve unless the solids content is 20 percent or lower. This not only reduces the volumetric efficiency of the protein separation, producing a lower weight of recovered protein per volume of protein containing feed, but also results in a more dilute protein containing eluant from the molecular sieve bed, making concentration and recovery of the protein more difficult and costly. The fact that such a "low solids content feed" process does have a high percent yield of protein based on the total protein in the feed does not outweigh the above disadvantages, particularly when the extremely low cost of the whey feed is considered. Although the actual explanation for the improvements achieved by using dried whey as a raw material for the process of this invention is not known, it may be related to the colloidal condition of whey proteins as affected by hydrogen bonding and by the formation of complexes with polyvalent metal ions and to an improvement in whey protein solubility as a result of the drying process.

The dried whey is mixed with water to prepare the protein rich liquid feed. Experiments have shown that, depending on the particular source of the dried whey, the mixing conditions and particularly the age of the reconstituted dried whey after mixing, may be usefully varied to obtain best solution of the protein. For example, an aging time from ½ to 4 hours at room temperature has been found to be most satisfactory. In general, it is desirable to use a sweet whey, such as cheddar whey (as distinguished from a cottage cheese whey) and to avoid mixing or storing of the reconstituted whey liquid for excessively long periods, since the viscosity tends to increase with age and eventually the protein deteriorates. Separation of lactose by crystallization from the reconstituted whey is also recommended. With a reconstituted cottage cheese whey it may be desirable to use well known techniques for improving the solubility of the protein.

Any molecular sieve material which does not degrade or contaminate the protein containing liquid and which selectively entraps molecules smaller than protein can be used in the bed. A molecular sieve having an exclusion limit of from 5,000 to 10,000 molecular weight is particularly preferred for separating whey protein from the lactose and salt components. One of the most satisfactory of molecular sieve materials is a stable modified dextran gel composed of crosslinked linear macromolecules in a three dimensional network of polysaccharide chains. Such modified dextran molecular sieves and their preparation are described in U.S. Patents Nos. 3,042,667 and 3,208,994. Dextran gel molecular sieve materials are available from Pharmacia Fine Chemicals, Inc. under the registered trademark "Sephadex". For separation of protein Sephadex G–25, which has an approximate limit for complete exclusion of about 5,000 molecular weight, and Sephadex G–50, which has an approximate limit for complete exclusion of about 10,000 molecular weight, may be used. Dry Stephadex G–25 will take up about 2.5 times its weight of water over a period of hours to form a gel. Stephadex G–50 will take up about 5 times its weight of water.

The molecular sieve when hydrated and swollen is packed into a vacuum filter or a cylindrical annular filter bed in a centrifugal filter. In a bed filled with the swollen gel, small molecules are able to move in the aqueous liquid which is both within and outside the gel. Using a dextran gel whose approximate limit for complete exclusion is from about 5,000 to 10,000 molecular weight, the larger protein molecules cannot penetrate the gel granules but can only move through the bed in the liquid outside the gel granules. These molecules which are larger than the largest pores of the swollen gel (i.e., above the exclusion limit) therefore pass through the bed in the liquid phase and are thus eluted first. The smaller molecules, primarily lactose and salts such as sodium, potassium and calcium phosphates, and perhaps some carbonates, penetrate the gel particles. The smaller molecules penetrate the gel particles to a varying extent depending on their size and shape.

As liquid is continuously passed through the gel bed, the smaller molecules are eventually eluted from the bed in the order of decreasing molecular size. For this reason the liquid eluted from the gel bed is desirably recovered in separate fractions in a repeating time cycle, the first fractions being liquid containing predominantly protein; the next fractions containing lesser protein and more lactose; the next fractions containing little protein, predominantly lactose and some salts; the succeeding fractions contain progressively smaller amounts of lactose, until the lactose concentration becomes negligible; the latter fractions being the result of washing the gel bed with water after the passage of a given amount of protein containing liquid. The degree of fractionation is dependent to a large extent upon the intended end use of the recovered product.

Washing the gel bed with water after passage of a given amount of protein containing liquid has the effect of regenerating the bed by forcing the smaller molecules through the bed in their order of decreasing molecular size. The cycle is then repeated, first protein liquor and then wash water, alternately. By use of suitable automatic controls the system may be completely automated to introduce protein liquor and wash water alternately on a time cycle basis and to segregate the discharge from the filter into appropriate fractions. The liquid fractions are then concentrated and preferably dried.

The dried product from the first fractions consists predominantly of protein. This is the major and preferred product. Lactose is recovered from other fractions by concentration and crystallization. Other dried products are recovered from whey consisting of a fraction which is predominantly lactose and salts or mixtures of lactose and protein. Where the value of the solids in the later wash fractions warrant the expense of concentration and drying, these products are recovered. Otherwise, they are simply discarded as waste. Because the later fractions are relatively dilute they do not present a serious pollution problem.

Although the process as herein described is a batch operation, it can be practiced in continuous manner by selecting appropriate equipment, such as continuous filters.

Whey, particularly cheddar whey, usually contains about 6 percent solids composed of about 1 percent protein and 5 percent lactose. It is commonly concentrated by evaporation to about 60 percent solids, and some of the lactose is removed by crystallization, producing a viscous whey molasses having about 40 percent solids and a 2/1 weight ratio of lactose to protein. However, such a whey molasses could not be passed through a bed of molecular sieve material without being diluted with water to about 20 percent solids or less, and the productive capacity at these low solids concentrations is relatively low, as mentioned earlier. For the process of this invention the natural whey or diluted whey molasses is dried under conditions which do not degrade the protein, most conveniently by spray drying, and is subsequently reconstituted by adding water to produce a reconstituted whey of solids content above 20 percent.

According to one form of the invention, a basket centrifuge is lined with Vyon filter material, which is a form of porous polyethylene, to retain the dextran gel molecular sieve material. The gel is introduced into the centrifuge head which is spun to distribute the gel material and establish an annular cylindrical bed. The centrifuge is operated at about 60 G (750 r.p.m.) until the gel filter cake is formed. Then the speed is increased to about 1000 G (3000 r.p.m.) and the centrifuge is operated at this speed for about 15 minutes to spin out any excess water.

A batch of reconstituted whey ($F_0$) is added to the centrifuge basket slowly. Even dispersion of the liquor batch throughout the filter cake is achieved by using a suitable applicator device. The centrifuge is operated at about 750 r.p.m. during the batch addition and this same speed is continued for about 5–10 minutes additional to allow the batch to equilibrate within the filter cake. Effluent may or may not be collected during the equilibration period.

At the end of the equilibration period the centrifuge speed is increased to 1000 G, which speed is maintained for about 10–15 minutes. During this time the eluant or effluent ($F_1$) containing the larger protein molecules is collected, most of the effluent being obtained during the first five minutes of operation at high speed. The speed is again reduced to about 750 r.p.m. and the filter cake is repeatedly washed with incremental additions of water to provide eluants ($F_2$, $F_3$, $F_4$, . . .). After the protein molecules are forced through the bed, the smaller molecules of lactose, salts, etc. are increasingly removed in the eluant portions. About 2 to 12 volumes of water are ordinarily used for washing the bed for each volume of whey molasses passed through it. When the eluant is clear, the washing is stopped and the speed is increased to about 3000 r.p.m. to expel the excess water from the filter cake. The cycle is now complete and the filter cake is ready to receive another batch of reconstituted whey. The initial effluent $F_1$ and early protein rich eluants $F_2$, $F_3$ . . . are first concentrated to about 30 to 40 percent solids and then preferably dried, as by spray drying. The resulting product is high in protein with some lactose and salts.

If a higher degree of purity of protein is desired than that obtained by one cycle through the dextran gel bed, the high protein containing effluent can be passed through the filter a second time, and the resulting effluent will be higher in protein content and lower in lactose and salt content. By this means a powder containing up to about 95% protein can be obtained. In the event of such a second cycle, the batch size may be increased by about one-third since the lactose content of the sample is then considerably reduced from the original lactose content. The subsequent high lactose eluants or fractions from the washing cycle may be concentrated to more than about 50 percent solids (above the saturation point for lactose) and held at low temperature for several hours to separate lactose by crystallization. Alternatively, the high lactose eluants may be subjected to electrodialysis to remove salts and then may be concentrated and spray dried or crystallized to recover the lactose. The solutions containing residual salts can be concentrated and dried if it is economically feasible to do so, either because of a market demand for the product or because of restrictions against discarding the liquid as waste.

An alternative to the recovery of protein from reconstituted whey by centrifugal filtration is the use of vacuum filtration. According to this alternative process a layer of dextran gel to the depth of up to two or three centimeters can be disposed on a sheet of Vyon filter material, preferably in the form of a moving belt, revolving horizontal disk or drum or plate filter. The reconstituted whey is sprayed onto the dextran gel layer. Then vacuum is applied from below and the protein containing effluent is collected. The filter layer is then sprayed with water. Vacuum is applied from below. The effluent from the wash cycle is collected, preferably as several fractions. The washed and regenerated gel is recycled for repeated use. The protein is recovered as previously described.

The filtration is preferably carried out at a temperature between about 60 and 100° F. (15 and 38° C.) and desirably at the lower temperature to minimize bacterial activity. The protein containing liquor is preferably introduced to the bed at about the same temperature. The temperature of water used for washing and for regeneration of the dextran gel is not critical.

For most efficient separation and recovery of protein the dextran gel filter bed is preferably at least about 15 to 20 mm. thick for both centrifugal filtration and flat bed vacuum filtration. The use of thicker beds increases the total volume required, adding cost without necessarily increasing efficiency, since longer separation and regenerating times are required. In a batch operation the weight of hydrated dextran gel is at least from about 2 to 4 times the weight of the protein containing feed utilized in each successive batch. In a continuous operation, as where separation and recovery takes place through a filter bed, on a moving belt, revolving disk or revolving drum or plate filter, or the like, substantially greater amounts of dextran gel must be provided. However, the amount of filter bed on the belt disk, drum or plate in the time period required for addition of the feed will still be from at least 2 to 4 times the weight of reconstituted whey added during the same time period.

While the final product is preferably recovered as a dry powder for convenience in storage, packaging, shipping, etc., for some purposes a concentrated syrup may be desirable. In this instance additives in the form of sugar and/or salt may be added to aid in preservation of the material or other preservatives may be added. Flavoring agents and other additives may be incorporated in the final product as desired.

For further illustration a series of runs were conducted with three different samples of whey prepared from dried whey and a sample of whey concentrate prepared directly from natural whey. The samples prepared from dried whey (Samples A, B, and C) had a solids content of 38.3, 39.0 and 38.0 percent respectively, whereas the whey concentrate (Sample D) had the highest solids content which could be passed through the molecular sieve bed, i.e. 20 percent. Results are set forth in Tables I and II. $F_0$ is the whey input to the bed of dextran gel. $F_1$ is the initial effluent. Successive introductions of 150 ml. of water produced effluents $F_2$, $F_3$, . . . etc. The procedure followed in these runs was as follows.

Approximately 10 grams of Sephadex G–50 were hydrated for three hours in an amount of water approximately equal to 10 volumes of the Sephadex molecular sieve material. A 16 cm. Büchner funnel with a Vyon filter insert was placed on a 2 liter vacuum flask. A suction pump was used to apply moderate suction to the flask. The hydrated Sephadex was poured into the funnel, excess water being removed by vacuum, to provide a relatively uniform bed of Sephadex on the Vyon filter insert. The Sephadex bed was about 1.5 cm. Dried cheddar whey powder (80 grams) was mixed with 120 cc. of water, using a counter rotating mixer to minimize foaming, until all lumps had dissolved. A 150 cc. volume of this reconstituted dried whey solution ($F_0$) was carefully poured onto the bed so as to disturb the bed as little as possible and to obtain even distribution of the solution. Vacuum was applied until all of the original liquid had been drawn through the bed, the initial effluent ($F_1$) being then removed from the flask. A volume of 150 cc. of water was then poured carefully over the bed, and vacuum was applied to draw the liquid ($F_2$) into the flask. This water wash treatment was repeated four more times to produce effluents $F_3$, $F_4$, $F_5$ and $F_6$.

The percent improvement in productive capacity, measured in terms of total weight of protein recovered with each effluent $F_1$, $F_2$, . . . as shown in Table II, clearly shows the higher protein content of the effluents when the whey feed is derived from dried whey as compared to the nautral whey feed at its maximum solids content.

Various other embodiments of the present invention will be apparent to those skilled in the art without departing from the scope thereof.

What is claimed is:
1. A process for the recovery of useful food protein from whey comprising
   (a) mixing dried cheese whey with water to provide a protein containing reconstituted whey liquid having a solids content above 20 percent and a viscosity low enough to permit passage of said liquid through a bed of molecular sieve material,
   (b) introducing said liquid into a bed containing a molecular sieve material having pores of a size permitting the penetration only of molecules smaller than whey protein, said molecular sieve material being a modified dextran gel having crosslinked linear macromolecules in a three dimensional network of polysaccharide chains,
   (c) entrapping in said molecular sieve material molecules smaller in size than whey protein,
   (d) forcing whey protein molecules through said bed in the liquid outside said molecular sieve material,
   (e) eluting said protein molecules from said bed, and
   (f) recovering the protein containing eluant.

2. The process of claim 1 in which said protein containing reconstituted dried whey liquid has a viscosity at 25° C. below about 30 centipoises.

3. The process of claim 1 in which said molecular sieve material is subsequently treated with water to wash out said whey protein molecules and said entrapped molecules in order of decreasing molecular weight in the eluant, thereby separating said whey protein from said entrapped molecules, collecting said whey protein containing eluant, and regenerating said molecular sieve material by further treatment with water to remove said entrapped molecules.

4. The process of claim 3 in which said molecular sieve material is treated with successive introductions of water.

5. The process of claim 1 in which said molecular sieve material has a pore size sufficient to entrap molecules with molecular weights less than about 5,000 to 10,000.

6. The process of claim 1 in which said reconstituted whey liquid is treated to remove at least part of the lactose before being introduced into said bed.

TABLE I

| Run | Source of Whey | Solids in $F_0$ Percent | Solids in $F_0$ Gms. | Viscosity (centipoises at 25° C.) | Process Fraction F | Yields (liquid) gms. (sol'n) | Protein, percent | Protein Recovered, gms. |
|---|---|---|---|---|---|---|---|---|
| A | OLD Purity (dried) | 38.3 | 69.3 | 10.3 | $F_0$ input | [1] 181 | 11.0 | [2] (19.9) |
|  |  |  |  |  | $F_1$ | 150 | 1.7 | 2.6 |
|  |  |  |  |  | $F_2$ | 118 | 4.3 | 5.0 |
|  |  |  |  |  | $F_3$ | 121 | 2.5 | 3.0 |
|  |  |  |  |  | $F_4$ | 158 | 1.0 | 1.6 |
|  |  |  |  |  | $F_5$ | 117 | .5 | .6 |
|  |  |  |  |  | $F_6$ | 174 | .5 | .9 |
| Total |  |  |  |  |  |  |  | 13.7 |
| B | NEW Purity (dried) | 39.0 | 70.6 | 23.4 | $F_0$ input | [1] 181 | 13.8 | [2] (25.0) |
|  |  |  |  |  | $F_1$ | 134 | 1.5 | 2.0 |
|  |  |  |  |  | $F_2$ | 105 | 4.6 | 4.8 |
|  |  |  |  |  | $F_3$ | 157 | 2.8 | 4.4 |
|  |  |  |  |  | $F_4$ | 194 | 1.0 | 2.0 |
|  |  |  |  |  | $F_5$ | 138 | .8 | 1.1 |
|  |  |  |  |  | $F_6$ | 156 | .4 | .6 |
| Total |  |  |  |  |  |  |  | 14.9 |
| C | DRY Peshkin (dried) | 38.0 | 68.8 | 10.3 | $F_0$ input | [1] 181 | 14.5 | [2] (26.2) |
|  |  |  |  |  | $F_1$ | 143 | 1.6 | 2.3 |
|  |  |  |  |  | $F_2$ | 134 | 3.7 | 5.0 |
|  |  |  |  |  | $F_3$ | 134 | 2.3 | 3.1 |
|  |  |  |  |  | $F_4$ | 153 | 1.1 | 1.7 |
|  |  |  |  |  | $F_5$ | 267 | .6 | 1.0 |
|  |  |  |  |  | $F_6$ | 165 | .4 | .7 |
| Total |  |  |  |  |  |  |  | 13.8 |
| D | Diluted whey concentrate (undried) | [3] 20.0 | 32.4 | (3) | $F_0$ input | [1] 162 | 6.7 | [2] (10.8) |
|  |  |  |  |  | $F_1$ | 133 | 1.7 | 2.3 |
|  |  |  |  |  | $F_2$ | 158 | 2.3 | 3.6 |
|  |  |  |  |  | $F_3$ | 158 | 1.5 | 2.4 |
|  |  |  |  |  | $F_4$ | 131 | .8 | 1.0 |
|  |  |  |  |  | $F_5$ | 150 | .3 | .4 |
|  |  |  |  |  | $F_6$ | 170 | .05 | .1 |
| Total |  |  |  |  |  |  |  | 9.8 |

[1] Weight of 150 milliliter aliquot.
[2] Input.
[3] Original 40% solids whey concentrate must be diluted at least 1:1 (20% maximum solids) or will not go through system. Fresh whey concentrate is 30.2 centipoises (before dilution).

TABLE II

| Fraction Extr'd | Accum. Total Grams Protein Recovered Using— | | | | Percent Improvement in Productive Capacity Dry Whey/Whey Conc. | | | Average Percent Improvement |
|---|---|---|---|---|---|---|---|---|
|  | Whey Conc. | Dried Whey A | Whey B | Whey C | Whey A | Whey B | Whey C |  |
| $F_1$ | 2.3 | 2.6 | 2.0 | 2.3 | +13 | −13 |  |  |
| $F_2$ | 5.9 | 7.6 | 6.8 | 7.3 | +29 | +15 | +24 | +23 |
| $F_3$ | 8.3 | 10.6 | 11.2 | 10.4 | +28 | +35 | +25 | +29 |
| $F_4$ | 9.3 | 12.2 | 13.2 | 12.1 | +31 | +42 | +30 | +34 |
| $F_5$ | 9.7 | 12.8 | 14.3 | 13.1 | +32 | +47 | +35 | +38 |
| $F_6$ | 9.8 | 13.7 | 14.9 | 13.8 | +40 | +52 | +41 | +44 |
| Total solids in $F_0$ | 32.4 | 69.3 | 70.6 | 68.8 |  |  |  |  |
| Total protein in $F_0$ | 10.8 | 19.9 | 25.0 | 26.2 |  |  |  |  |

7. The process of claim 1 in which said whey protein molecules are forced through said bed by centrifugation.

8. The process of claim 1 in which said whey protein molecules are forced through said bed by the application of a differential pressure across said bed.

9. The process of claim 1 in which said whey protein molecules are forced through said bed by vacuum applied to the discharge side of said bed.

10. The process of claim 1 in which said dried whey is a dried cheddar whey.

11. The process of claim 3 in which said protein containing eluant is dried to provide a dry protein containing product.

References Cited

UNITED STATES PATENTS 3,002,823   10/1961   Flodin et al. _____ 23—293

OTHER REFERENCES

Journal of Dairy Science, vol. 50, 1967, Morr et al., pp. 305–306, date relied on, Sept. 23, 1966.

WILLIAM H. SHORT, Primary Examiner

HOWARD SCHAIN, Assistant Examiner

U.S. Cl. X.R.

99—2, 19, 57, 116; 127—31